Aug. 6, 1957   G. DELZANNO   2,802,168
CIRCUIT FOR ELECTRIC WELDING MACHINES
Filed April 24, 1953   3 Sheets-Sheet 1

Aug. 6, 1957 G. DELZANNO 2,802,168
CIRCUIT FOR ELECTRIC WELDING MACHINES
Filed April 24, 1953 3 Sheets-Sheet 2
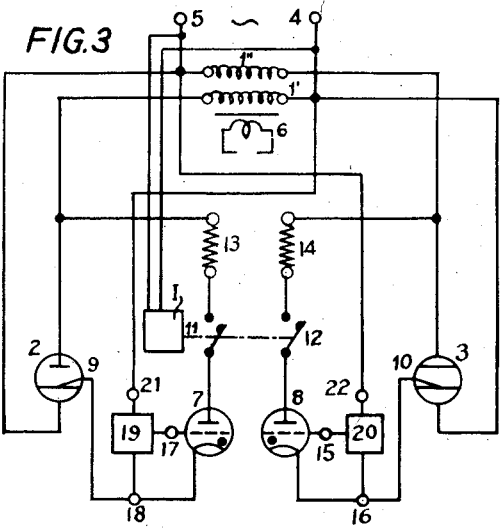
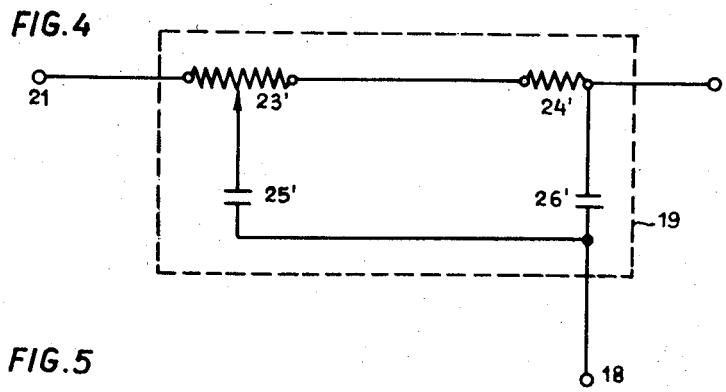
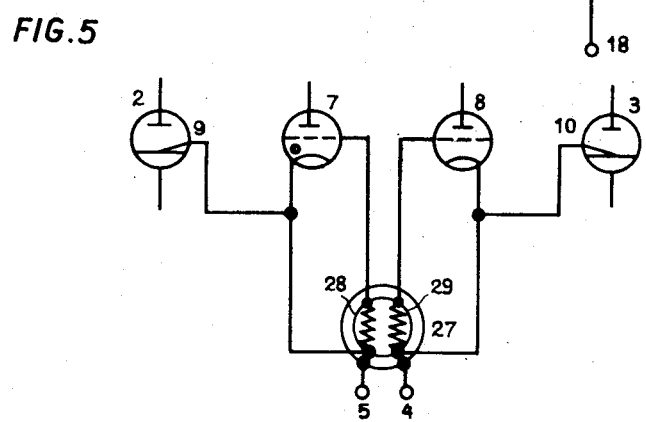

Aug. 6, 1957 G. DELZANNO 2,802,168
CIRCUIT FOR ELECTRIC WELDING MACHINES
Filed April 24, 1953 3 Sheets-Sheet 3

United States Patent Office

2,802,168
Patented Aug. 6, 1957

2,802,168

CIRCUIT FOR ELECTRIC WELDING MACHINES

Giuseppe Delzanno, Turin, Italy, assignor to Fiat Societa per Azioni, Turin, Italy Application April 24, 1953, Serial No. 350,887

Claims priority, application Italy August 5, 1952

1 Claim. (Cl. 323—18)

This invention concerns improvements to operating or adjustment controls of electric monophase resistance welding and similar machines, in which the effective value of an alternating current is adjusted by varying the fraction of each half-period during which the current actually flows through the circuit, said variation, as well as opening and closing of the circuit, being carried out by controlling the ignition of ignitrons, thyratrons or similar electronic tubes.

More particularly, one of the objects of this invention is to improve the device for adjusting the ignition delay of gas discharge tubes, in order to obtain a wider, easier and safer adjustment than obtainable by the devices available heretofore.

A further object of this invention is to render symmetrical the arangement of the control tubes with respect to the circuit to be controlled, and to improve connection of the phase shift networks in order to avoid uneveness in working, erroneous connections due to exciting of transients by effect of sharp variations in voltage at the inlet of the said phase shift networks.

A further object of this invention is to simplify the circuit closing and opening controls, making the independent of the current adjusting device and combining both controls by the simplest and safest means. This affords by the use simply of electromagnetic relays circuits to make automatic the sequence of the operative and inoperative cycles, with the possibility of adjusting independently at will the period of both cycles.

Figure 3 shows a further modification of the circuit according to Figure 1, still with the object of reaching a substantial symmetry and making voltage applied at the inlet of the phase-shift networks constant.

Figure 4 shows a diagram of an improved phase-shift network in accordance with one of the objects of this invention.

Figure 5 shows a modification of the previous circuits, obtained by the use of a mono-phase induction variable coupler for the sake of a wider and more uniform current adjustment.

Figure 1:
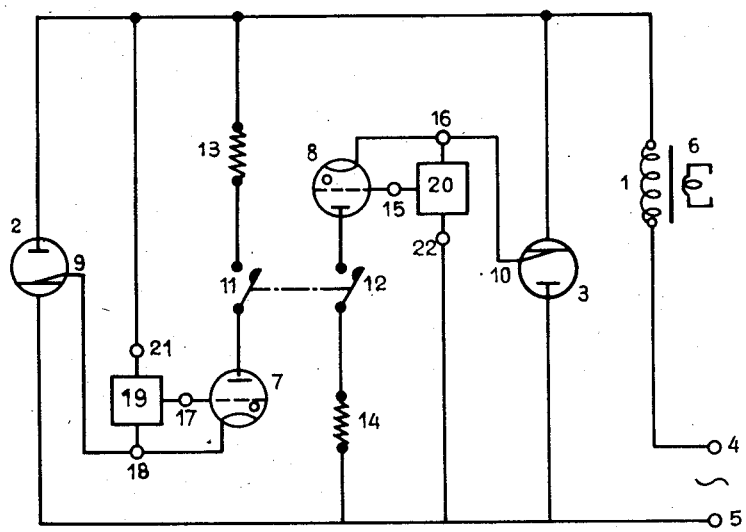
Figure 1 is a fundamental diagram of an electric monophase resistance welding machine taken as an example of the devices in connection with which the invention may be used, and in which it is possible to employ the improvements according to this invention, and relating to the phase-shift network arrangements, the circuit opening and closing devices, the incorporation of automatic time controls.

Figure 1 shows the fundamental diagram of a monophase resistance welding machine, taken as an example of the devices in connection with which this invention is used. The welding transformer has its primary winding 1 connected in series with a set of two ignitrons 2, 3, the circuit comprising the primary winding 1 and the set of two ignitrons is directly fed by an alternating voltage supply network, which leads to the terminals 4, 5. The secondary winding 6 of the transformer directly feeds the welding electrodes.

The ignitrons 2, 3 are alternately conductive, inasmuch as current flows through the ignitron 2 during the half-period in which current flows from the terminal 4, through the primary winding 1 of the transformer to the terminal 5, while current flows though the ignitron 3 when it is directed in opposite direction from the terminal 5, through the same primary winding 1, to the terminal 4.

In order to cause current to flow through an ignitron, it is not however sufficient that the cathode and plate have the correct polarity to lead current from the plate to the cathode within the ignitron, but it is necessary that the ignition should be started, which is obtained, as it is well known, by causing current to flow from the ignitor to the cathode. In the specific device starting is obtained by means of thyratrons 7, 8, which on igniting send current to the ignitors 9, 10 respectively.

Starting of the thyratrons occurs when the switches 11, 12 are closed, the voltage between the anode and cathode of the thyratrons is a positive one and the grid voltage exceeds the critical value. In the specific device considered, the anodes of the thyratrons 7, 8 are connected, through the limiting resistors 13, 14, to the anodes of the ignitrons, so that the thyratrons are ready to be started and ignite the ignitron as soon as the anodic voltage of the latter becomes positive, provided the switches 11, 12 are closed. More particularly, when current flows through the ignitron 2, a small negative voltage is set up between the plate and cathode of the thyratron 8, equalling in numeric value the drop in potential in the arc of the ignitron, sufficient for preventing ignition of said thyratron and consequent starting of the ignitron 3. As current ceases to blow through the ignitron 2, current being annulled and tending to become reversed, all the main voltage is located between the plate and cathode of the ignitron 3 and of the thyratron 8 and the plate is generally positive with respect to the cathode, because current in the network is generally delayed in phase with respect to the main voltage. Under these conditions, the thyratron 8 is ready for ignition, but does not effectively ignite, starting flow of current through to the ignitron 3, till the voltage between the terminals 15 and 16 exceeds the critical voltage value. During the next half-period, after cutting off current in the ignitron 3, the same cycle is repeated in connection with ignitron 2 and thyratron 7, the latter igniting as the voltage between the terminal 17, 18 exceeds the critical value.

It will be seen that the specific arrangement causes the ignitrons 2, 3 to lead current only one at a time and moreover permits of delaying starting of each of them, so as to allow current to circulate during a more or less reduced fraction of each half-period and obtain thereby adjustment of the effective value of the current in the primary winding and therefore also in the secondary winding of the welding transformer. This adjustment can for instance be obtained by supplying a voltage to the terminals 15, 16, and 17, 18 by means of two independent networks 19, 20 provided with three terminals, of which the third terminal 21, 22 is connected to the anode of the ignitrons 2 and 3 respectively. The two networks are identical and supply to the grids of the thyratrons phase shifted voltages with respect to the network voltage, the phase difference being adjustable simultaneously and in the same manner for both, so that, on variation of the phase difference, current is obtained in a well-known manner. It is obvious that the current which flows through the network 19 (or 20) from the terminal 21 to the terminal 18 (or 20) (or from terminal 22 to terminal 16) and to the ignitor 9 (or 10) should be insufficient to start the ignitron; otherwise, the possibility of current adjustment would fail and the device would miss its principal object for which it has been developed. This imposes a given limitation in choice of the values of the parameters of the phase-shift networks, which should be accounted for in design.

Figure 1A:
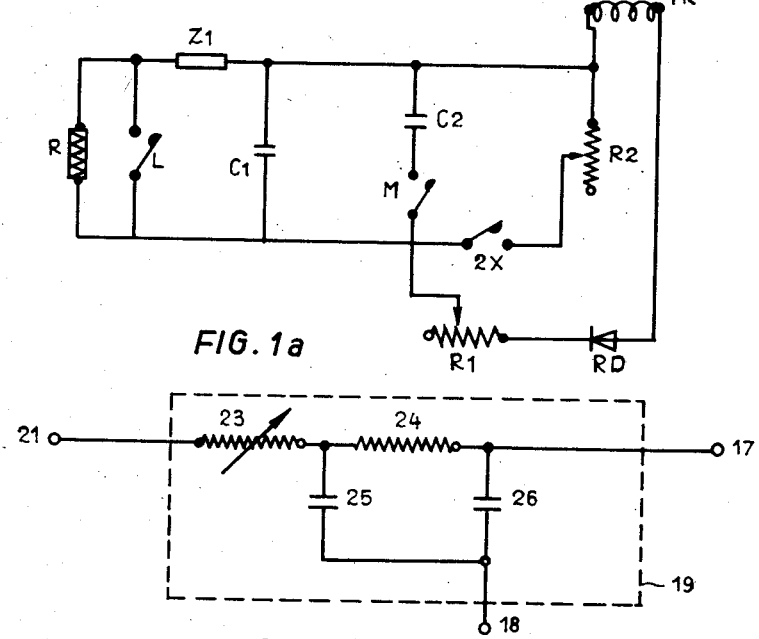
Figure 1a shows a phase shift network of a known type.

One of the possible arrangements of the circuit of the phase-shift network of known type is shown in Figure 1a. The network comprises a variable resistance 23 and a resistance 24 connected in series and interposed between the terminals 21 and 17. The terminal 18 is connected over the condenser 26 to the terminal 17 and to an intermediate point situated between the variable resistance 23 and resistance 24 over the condenser 25. By varying the value of resistance 23 it is possible to adjust the phase difference between the voltages existing, between the terminals 21 and 18 and between the terminals 17 and 18.

The above description and Figure 1 are principally intended to explain operation of one of the best known devices and to lay a base for the easy understanding of the details to which this invention relates.

One of said details refers to modifications that may be made to the circuit shown in Figure 1, in order to improve its operation, chiefly in respect of the connection of the phase shift networks. In fact, the arrangement according to Figure 1 is objectional in that the ignitrons are connected therein asymmetrically in the circuit of which adjustment of current is desired, the phase shift networks 19, 20 being consequently subjected to sharp and frequent variations in inlet voltage applied between the terminals 21, 18 and 22, 16. It has already been mentioned that the voltage, for instance between 21 and 18, is a negative one and equals the internal drop of the ignitron 3, when the latter ignitron leads current and no current flows through the ignitron 2; successively, when the flow of current ceases also through the ignitron 3, between the same terminals the full main voltage is set up, with a relatively great positive value. These sharp variations in voltage are followed by more or less damped transitory oscillations, which may result in unevenness in working, unless care is taken to make them inefficient. This implies a further complication in design and the possibility of disturbances in operation through unexpected, even accidental causes. In order to avoid these drawbacks, for instance, one of the arrangements shown in Figures 2 and 3 may be resorted to, which illustrate one of the objects of this invention.

Figure 2:
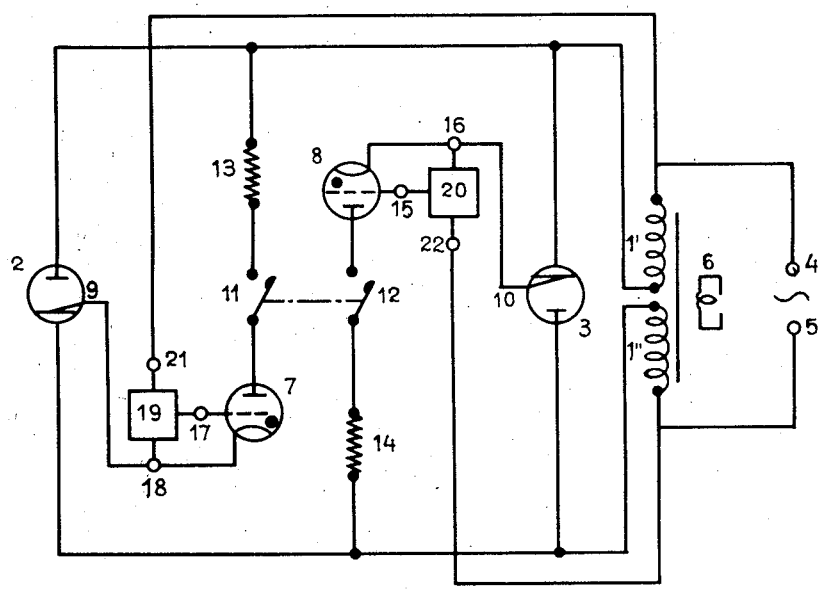
Figure 2 shows a modification of the circuit shown in Figure 1, by which the adjusting circuit is symmetrical and the variations in voltage at the inlet of the phase-shift network are limited.

In the arrangement shown in Figure 2, the circuit of the ignitrons and of the thyratrons substantially equals the circuit shown in connection with Figure 1; the arrangement of the welding transformers and connection of the phase-shift networks 19, 20 is, however, different. More particularly, the primary winding of the transformer is interrupted at half-length and is made up of two equal half-windings electrically insulated from each other, denoted on the drawing by 1' and 1". The two outer terminals of the two half-windings lead to the supply network, while the two inner ends of the same windings lead to the ignitron set. In other words, even more broadly than shown by the example according to Figure 2, the circuit in which current should be adjusted, is interrupted at its electric center; electric continuity being re-established through the set of opposite ignitrons, which operate exactly as in the arrangement shown in Figure 1. Consequently, the voltage between the points 21 and 18 varies between the highest voltage value between the terminals 4 and 5 and one-half the said value.

The arrangement of the phase-shift networks 19, 20 is different. While the terminals 15, 16 and 17, 18 are connected exactly as in the arrangement shown in Figure 1, the terminals 21 and 22, instead of being connected to the anodes of the ignitrons 2, 3, respectively, are directly connected to a terminal of the main supply, more particularly to the terminal which is connected to the circuit half situated on the side of the anode of the ignitron, to which the main supply is connected. That is, the terminal 21 of the network 19 is connected to the terminal 4 and the terminal 22 of the network 20 is connected to the network 5. In this manner, each phase-shift network is fed between the terminals 21 and 18 and between the terminals 22 and 16, respectively, by one-half the main supply voltage, decreased by the small arc drop, when at least one of the ignitrons is conductive, and by the full main supply voltage, when both ignitrons are not conductive. Consequently, variations in voltage at the terminals of the phase-shift networks are considerably reduced, thereby eliminating operating disturbances connected with the setting up of transitory voltages in the networks.

The arrangement shown in Figure 3 adds a further improvement, the circuit reaching here its maximum degree of symmetry. However, it is not applicable to all cases, but only when it is desired to adjust current on the secondary winding of a transformer by acting on the primary current. More particularly, the transformer comprises in this case two identical primary windings 1' and 1", arranged similarly in respect of the magnetic circuit of the transformer and the secondary winding 6. Moreover, while in the case of Figure 2 the two primary half-windings are each provided for one half the main supply voltage and both for the maximum current which is reckoned to flow under full load in the circuit, in the specific case the two windings 1' and 1" are both calculated for the full main supply voltage and for one-half the maximum full load current. Each of the two primary windings is connected in series to one ignitron, the primary winding 1' being connected to the ignitron 2 and the primary winding 1" being connected to the ignitron 3, so that the system is constituted by two rectifiers of one half-wave, of which the anodic currents bring about the magnetisation of the same core. In respect of the main supply, magnetic circuit and secondary winding of the transformer, the arrangement shown in Figure 3 operates exactly like the arrangements shown in Figures 1 and 2. However, the phase-shift networks can in the present case be connected by the terminals 21, 22 direct to the main supply terminals 4, 5, so that they are supplied over the small resistance of the ignitors between the terminals 21 and 18 and between the terminals 22 and 16 constantly with the full main supply voltage. No variation occurs in these supply voltages and consequently, no transitory voltage is started which may objectionably affect operation.

A further object of this invention is the structure of the phase shift networks. Figure 4 shows an arrangement preferred over those employed heretofore. The network consists of a potentiometer 23', a fixed resistor 24' and two stationary condensers 25', 26'. The improvement over other known systems consists in replacing a variable resistor by the potentiometer 23' in order to permit adjustment of the phase difference between the voltages existing between the terminals 21, 18 and between the terminals 17, 18, minimising the simultaneous variation in width of the voltage between the terminals 17, 18. By the arrangement described, the resistance between the terminals 21 and 17 remaining as a whole constant, while the phase difference is adjusted by displacement of the slide of the potentiometer 23′, the voltage between the terminals 17 and 18 remains practically constant within wide limits of phase variation. This result, which is not achieved by any other variable resistance or capacity systems, ensures an optimum adjustment and smoothest operation of the system under any load conditions, for the thyratron is controlled practically with a constant grid voltage width over the full adjustment range from no load to full load.

Of course, the network 20 is identical in structure to the network 19 and the slides of the potentiometers of the two networks are controlled by the same handle in order to adjust in common, simultaneously and by the same extent, ignition of the two ignitrons and therefore afford constantly identical current half-waves (positive and negative wave), which results in the absence of a continuous component and even harmonics in the network current.

It will be understood that in the arrangements shown in Figures 2 and 3, as well as in Figure 1, phase-shift networks of other types may be employed. More particularly, with the arrangements shown in Figures 2 and 3 it is possible to use the known mono-phase induction variable couplers, provided they comprise two secondary windings, electrically insulated from each other and arranged to supply voltages opposite in phase to each other. A possible arrangement is shown in Figure 5, in which essential parts only are illustrated, the remaining circuit portion being carried out according to any of the previously described or other equivalent diagrams. In this figure, 27 denotes a monophase induction variable phase shift device connected by the primary terminals directly with the main supply terminals 4, 5 and provided with two secondary terminals 28, 29, electrically insulated from each other and arranged to supply at their ends two voltages opposite in phase to each other. The ends of the winding 28 are connected to the grid and cathode of the thyratron 7, respectively, while the ends of the winding 29 are connected to the grid and cathode of the thyratron 8, respectively, so that the voltage between the grid and cathode of the thyratron 7 is constantly in phase opposition to the voltage between the grid and cathode of the thyratron 8. The remaining circuit portion, but for the network 19, 20 which are dispensed with, is identical with that shown in Figures 1, 2 or 3. Operation is also quite similar. Rotation of the inductor winding of the induction variable coupler is sufficient for satisfactory adjustment.

The invention further concerns the circuit closing and opening controls. The electronic current adjustment system is generally utilised for opening and closing the circuit, supplying to the grids of the thyratron a negative voltage for opening the circuit, preventing ignition of the thyratrons and consequent starting of the ignitrons, and removing said voltage for closing the circuit. This system, which is actually an electronic switch, is objectionable, in that it requires extremely elaborate circuits, that are easily damaged, difficult to keep as well as two different functions of the same members with the consequence that it is not fool-proof.

All these drawbacks, including the necessity of providing direct voltages for locking the thyratron, are eliminated by the proposed modification, which consist in combining the electronic adjusting devices with electromechanical switches connected in the anodic circuits of the thyratron. This maintains the advantages deriving from the control of the high intensity circuit in which the ignitrons are connected by breaking low currents, such as the anodic currents of the thyratrons, while avoiding all the above-mentioned drawbacks.

The switches referred to above are indicated by 11, 12 in Figures 1, 2 and 3. These switches are mechanically connected for actuation by one control; or they are in the form of a single bipolar switch. It will be obvious that, as long as the switches 11 and 12 remain open, the thyratrons 7 and 8 cannot be under load, the ignitrons 9 and 10 being therefore inoperative, so that the ignitrons 2 and 3 are not started and no flow of current takes place in the main circuit. On closing of the switches 11 and 12 by hand or pedal or a relay I, as shown in Fig. 3 the circuits are capable of operating in the above described manner.

Figure 6:
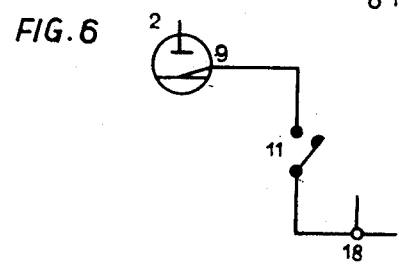
Figure 6 shows a modification of the arrangement of the switches for opening and closing the circuit, in which opening of the circuit is simpler and safer.

The arrangement may be modified by arranging the switches 11, 12 instead of on the connection of the anodes of the thyratrons, on the connection between the cathode of the thyratrons and ignitors. By placing the switch 11, for instance, directly in series with the ignitor 9, as indicated in Figure 6, the advantage of breaking a low current, as the thyratron current always is, is maintained and combined with reliability in operation, for cutting off of the ignitor makes starting of the ignitron fully impossible even for accidental causes. Of course, the switch 12 should be arranged in this case in a similar manner on the connection of the ignitor 10.

The use of switches for closing or opening the circuit in which the current intensity is adjusted, will make operation of the circuit fully automatic, operating periods, in which the main circuit is closed, being rhythmically followed by inoperative periods, during which the circuit is open, so that the period of the operative cycles may be adjusted fully independently of the period of the inoperative cycles. The system, which simply consists of a combination of electromagnetic relays, may be utilised, for instance, for controlling welding machines. In this case, adjustment of the period of the operative cycle together with the adjustment of the welding current explained above, permits of carrying out welding under optimum conditions, while adjustment of the period of inoperative cycles permits of cutting out current during the time required for moving the workpiece to be welded from a welding position to the next one.

Figure 7:
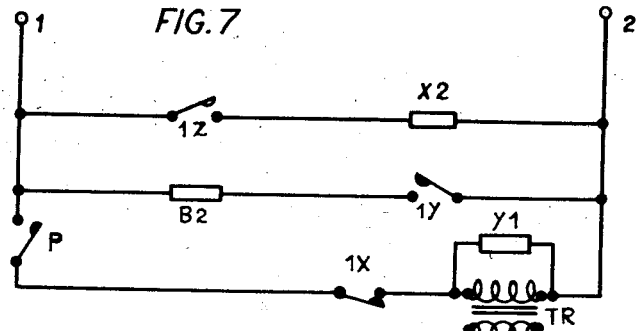
Figure 7 shows a circuit for automatically controlling closing and opening of the main circuit, in order to permit independent adjustment of the period of the operative and inoperative cycles.

A circuit for the automatic control of the operative and inoperative periods is shown by way of example in Figure 7. The voltage of the alternating current supply network is fed to the terminals 1 and 2. The contact P is controlled by hand or pedal and produces, as long as it is closed, the automatic sequence of the controls. On closure of the contact P the primary winding of the transformer TR is fed over the contact 1X which is closed in inoperative conditions and the coil of the relay $Y_1$ is energised. On energizing, this relay 1 closes the contact 1Y supplying voltage to the coil of the relay B2, which closes the contacts of the anodic switches of the thyratrons 7 and 8, denoted by 11 and 12, respectively, in the previous figures. This sets in operation the starting circuit for the ignitrons 2 and 3 (see previous figures) and causes current to flow through the main circuit at the value determined by the previously effected adjustment of the phase-shift networks 19 and 20. At the same time, the secondary winding of the transformer TR energises the loading circuit over the rectifier RD and adjustable resistors $R_1$ of the condenser $C_1$. The loading period of the condenser may be varied by modifying the resistance of $R_1$ connected in the circuit, by either connecting by means of the keys L, M the resistor R and condenser $C_2$ in parallel on the condenser $C_1$. When the condenser $C_1$ has reached a sufficient loading voltage, the coil of the relay $Z_1$ is energised terminating the operative period. The relay $Z_1$ closes the contact 1Z which energises the coil of the relay $X_2$; the latter opens contact 1X and closes contact 2X. On opening of 1X the relay $Y_1$ is disenergised and the contact 1Y is opened, disenergising the relay B2 and consequently opening the switches 11, 12, which break the current in the thyratrons and prevent successive flows of current through the ignitrons. On disenergizing of the relay $Y_1$ supply is cut out to the transformer TR also, and no current flows through the condenser loading circuit of the condenser $C_1$, which on closure of the contact 2X discharges on the resistor $R_2$. The period of this discharge may be adjusted, independently of the charging period of the condenser by adjusting $R_2$. On discharge of the condenser $C_1$ the relay $Z_1$ is disenergized and contact 1Z is reopened. $X_2$ is disenergized, the contact 2X is re-opened, the condensers are brought to their charging position, the contact 1X is closed once more energising $Y_1$ and TR, and the sequence starts again.

The circuit may be completed by further relays controlling movement of the tools and supply of cooling water or air. On re-opening and leaving open the contact P, energising of all the relays is prevented, the full circuit being inoperative.

What I claim is:

In a device for feeding electric monophase resistance welding machines, the combination of a first and second terminal for connecting the device to a source of alternating monophase current, a power transformer having a primary winding and a secondary winding connected to the load circuit of a welding machine, said primary winding comprising a first and a second equal windings, each connected at one end to one of said first and second terminal, respectively, a first and second equal ignitron each having an anode, a cathode, and an ignition electrode and being connected by its anode to the other end of one of said first and second windings, and by its cathode to said first and second terminal, respectively, a first and second equal thyratrons, each having an anode, a cathode and a grid, inserted between the ignition electrode and the anode of the first and second ignition, a switch and a limiting resistor in series between each of the anodes of the first and second thyratons and of the first and second ignitrons, respectively, a first phase-shift network connected to the grid of said first thyratron and inserted between the cathode of the first thyratron and said second terminal, a second phase-shift network equal to the said first phase-shift network and connected to the grid of said second thyratron and inserted between the cathode of the second thyratron and said first terminal, the switches inserted between the anodes of said first and second thyratrons and of the first and second ignitrons, respectively, being connected therebetween for simultaneously opening and closing the circuits of said thyratrons, automatic means fed through a main switch by the same source of alternating monophase current which feeds said power transformer being further provided for actuating said switches upon the closure of said main switch.

References Cited in the file of this patent

UNITED STATES PATENTS

| | | |
|---|---|---|
| 1,921,982 | Wittkuhns | Aug. 8, 1933 |
| 2,251,237 | Bivens | July 29, 1941 |
| 2,270,601 | Overbeck | Jan. 20, 1942 |
| 2,298,240 | Toepfer | Oct. 6, 1942 |
| 2,310,112 | Palmer et al. | Feb. 2, 1943 |